US 6,564,839 B1

(12) United States Patent
Manne et al.

(10) Patent No.: US 6,564,839 B1
(45) Date of Patent: May 20, 2003

(54) PNEUMATIC TIRE HAVING A LOAD DEPENDENT ADAPTIVE FOOTPRINT SHAPE

(75) Inventors: Philippe Marie Manne, Ettelbruck (LU); Laurent Colantonio, Bastogne (BE); Johan Peter Dahlberg, Luxembourg (LU); Frank Philpott, Waldbredimus (LU)

(73) Assignee: The Goodyear Tire & Rubber Company, Akron, OH (US)

(*) Notice: Subject to any disclaimer, the term of this patent is extended or adjusted under 35 U.S.C. 154(b) by 178 days.

(21) Appl. No.: 09/704,144

(22) Filed: Nov. 1, 2000

(51) Int. Cl.⁷ .................. B60C 11/03; B60C 101/00
(52) U.S. Cl. .................. 152/209.14; 152/209.25
(58) Field of Search .............. 152/209.14, 209.16, 152/209.25, 454, 209.8

(56) References Cited

U.S. PATENT DOCUMENTS

| | | |
|---|---|---|
| 3,782,438 A | 1/1974 | Mirtain |
| 3,949,797 A | 4/1976 | Mirtain et al. |
| 3,980,118 A | 9/1976 | Kinas |
| 3,982,579 A | 9/1976 | Mirtain |
| 4,079,768 A | 3/1978 | Verdier |
| 4,124,052 A | 11/1978 | Beauchamp |
| RE30,549 E | 3/1981 | Mirtain et al. |
| 4,265,287 A | 5/1981 | Abe et al. |
| 4,281,702 A | 8/1981 | Grosch et al. |
| 4,456,046 A * | 6/1984 | Miller |
| 4,567,929 A | 2/1986 | Els et al. |
| 4,570,691 A | 2/1986 | Martus |
| 4,662,416 A * | 5/1987 | Yagi et al. |
| 4,722,378 A | 2/1988 | Corolla et al. |
| 4,823,855 A | 4/1989 | Goergen et al. |
| 4,881,586 A | 11/1989 | Shinomiya |
| 5,115,849 A * | 5/1992 | Corner |
| 5,119,857 A * | 6/1992 | Kukimoto |
| 5,174,214 A | 12/1992 | Oda et al. |
| 5,178,698 A | 1/1993 | Shibata |
| 5,435,364 A | 7/1995 | Hasegawa et al. |
| 5,660,652 A | 8/1997 | Young et al. |
| 5,733,393 A | 3/1998 | Hubbell et al. |
| 5,849,118 A * | 12/1998 | Matsumoto |

FOREIGN PATENT DOCUMENTS

| | | | |
|---|---|---|---|
| DE | 2153774 | | 5/1973 |
| DE | 2128232 | | 11/1973 |
| EP | 320143 | * | 6/1989 |
| GB | 1431691 | | 4/1976 |
| JP | 60-64003 | * | 4/1985 |
| JP | 2-34404 | * | 2/1990 |
| JP | 3-189211 | * | 8/1991 |
| JP | 4-87802 | * | 3/1992 |
| JP | 6-171313 | * | 6/1994 |
| WO | WO 99/14064 | * | 3/1999 |

* cited by examiner

Primary Examiner—Steven D. Maki
(74) Attorney, Agent, or Firm—Howard M. Cohn (57) ABSTRACT

The present invention relates to a radial ply tire (230) with a tread (232) subdivided transversely into a central portion (250) having central ribs (260a,260b), shoulder portions (254a, 254b) having shoulder ribs (270a,270b) and intermediate portions (252a, 252b) having intermediate ribs between the central portion and the shoulder portions. The tread has intermediate grooves (262a,262b) between the central ribs and the intermediate ribs (266a,266b) and shoulder decoupling grooves (264a,264b) between the intermediate ribs and the shoulder ribs (270a,270b). The shoulder decoupling grooves having a depth (D1) being less than the intermediate decoupling grooves whereby the footprint width of the tread surface can expand from first width (NLFPW) under normal load to a second width (HLFPW) under heavy load.

12 Claims, 6 Drawing Sheets

PNEUMATIC TIRE HAVING A LOAD DEPENDENT ADAPTIVE FOOTPRINT SHAPE

TECHNICAL FIELD

The present invention relates to an improved pneumatic tire and tread therefore, and more specifically to the contact of the tread with the ground during dynamic operating conditions.

BACKGROUND OF THE INVENTION

The prior art incorporates the concept that the width of a tire footprint is designed to be load dependent. Moreover, as discussed in U.S. Pat. No. 3,782,438 ('438) and U.S. Pat. No. 3,949,797 ('797), when the tread of a pneumatic tire runs in a straight line, resistance to rolling increases as a function of the speed of travel. This resistance increases very rapidly (essentially exponentially) with increasing speed. The result is as the speed of tire travel increases, it is important that the effective width of the tire footprint., i.e. the tread on the ground, be as narrow as possible to minimize the dissipation of energy due to cyclic deformation of the tread. Cyclic deformation of the tread rubber causes heating of the pneumatic tire and the tread, in particular. By reducing frictional resistance, fuel consumption related to rolling resistance is reduced.

Further as discussed in the ('438) and ('797) patents, the phenomenon known as "aquaplaning" or "hydroplaning" occurs on a road surface covered with a layer of liquid, and specifically water, in which, the water cannot be evacuated fast enough from under the wheels of a vehicle traveling at a high speed by the grooves or designs in the tread of the pneumatic tires. As a consequence, the tires of the vehicle are lifted or separated from the ground and are supported only by the layer of liquid. This in turn, results in practically complete loss of adherence of the tire to the ground and consequently, the loss of steering or directional control of the vehicle and the risk of skidding, swerving, and serious accidents. The critical speed at which such a dangerous phenomenon may occur is a function of various parameters or factors such as the inflation pressure of the pneumatic tire, the vehicle load on the tire, the depth of the tread design of each pneumatic tire, the effective width of running contact (the tire footprint) with the road, etc. The critical speed is an inverse function of the effective width of tire footprint with the road such that a narrower footprint (a narrower tread) on the ground results in a higher critical speed, which is preferable for decreasing the risk of the "aquaplaning" phenomenon. It can be stated, however, if the effective running contact or footprint, i.e. the tread is narrow, the pressure in the area of contact with the ground is generally higher.

In addition, a narrower tread may be less stable and adversely effect the vehicle behavior during turning. For example, while turning a vehicle through a curve at a relatively high speed, the centrifugal force and possibly other passive forces of inertia or the lateral or transverse reaction acting on each tire, tend to make the tires tilt to the side, so that a portion (radially internal with respect to turning) of the tread of each pneumatic tire, which is initially in contact with the ground, rises and separates from the ground. As the speed increases, the tread adheres to the ground by smaller and smaller portions of the footprint (radially exterior with respect to turning) which increases the risk of skidding. Consequently, a narrow tread, i.e., a small effective width of running contact or small footprint, is generally undesirable to the safety of travel during turning.

It is therefore seen that the requirements or conditions for maintaining an optimum route or optimum behavior of an automobile vehicle are contradictory and relatively incompatible for straight-line travel and turning, since in straight-line travel it is important that the effective width of running contact with the ground or the tread of each pneumatic tire tread be as narrow as possible, while it must, in contrast, be as wide as possible for turning motion.

Moreover, during braking, a wider contact width of the tire footprint is preferred so as to increase frictional force and thus yield a shorter braking distance.

An example of a variable tread design is disclosed in U.S. Pat. No. 4,823,855 ('855) to Goergen et al., having a common assignee with the present invention. The '855 Patent discloses "a tire according to the invention that due to its cross-sectional shape and preferred tread geometry, the tire will operate to provide preferred performance characteristics at different operating loads and in different operating conditions. For example, when the tire is mounted upon a small all-purpose vehicle and operated on a paved roadway at everyday commuting loads, which are far less than the tires rated load, the central portion CP of the tread is almost exclusively in contact with the roadway. The higher net-to-gross ratio of this central portion of the tread provides good tread wear and on-highway handling. When the tire is operated under higher loads and/or off-the-road the laterally outer zones $OP_1$, $OP_2$ of the tread also come into operation to provide greater traction in mud or sand and improve off-highway handling. The varying stiffness of the block elements across the tread also contributes to the performance characteristics of the tire under varying operating conditions."

SUMMARY OF THE INVENTION

The present invention relates to a radial ply tire with a carcass having a crown region, two sidewalls extending from a first end of the sidewalls radially inward from the surface of the crown region, and two beads disposed at a second end of the sidewalls and one or more plies extending through the crown region and between the beads and wrapped thereabout. A belt structure overlies the crown region of the carcass and a tread overlies the belt structure and is secured to the sidewalls in the shoulder portions. The tread is subdivided transversely into a central portion having central ribs, shoulder portions having shoulder ribs and intermediate portions having intermediate ribs between the central portion and the shoulder portions. The tread has first and second intermediate grooves between the central ribs and the intermediate ribs. First and second shoulder decoupling grooves are disposed between the intermediate ribs and the shoulder ribs. The tread may or may not have a central groove. The first and second shoulder decoupling grooves having a depth (D1) being 40% to 70% the depth (D2) of the first and second intermediate grooves whereby the footprint width of the tread surface can expand from first width (NLFPW) under normal load to a second width (HLFPW) under heavy load wherein the second width is 10% to 40% greater than the first width.

BRIEF DESCRIPTION OF THE DRAWINGS

Reference will be made in detail to preferred embodiments of the invention, examples of which are illustrated in the accompanying drawings. The drawings are intended to be illustrative, not limiting. Certain elements in some of the drawings may be illustrated not-to-scale for illustrative clarity.

In the drawings, the hundredth's place of each reference number usually matches the Figure number, and similar elements are usually referred to by similar reference numbers. For example, element 199 in FIG. 1 and element 299 in FIG. 2 might indicate corresponding or substantially similar elements.

The same element appearing in different figures is usually given the same reference number in all figures.

In a single drawing, similar elements may be assigned the same number, and may be distinguished from each other by a letter suffix.

For illustrative clarity, the cross-sectional views presented herein may be in the form "near-sighted" cross-sectional views, omitting certain background lines that would otherwise be visible in a true cross-sectional view.

The structure, operation, and advantages of the invention will become further apparent upon consideration of the following description taken in conjunction with the accompanying drawings, wherein.

DEFINITIONS

"Axial" and "axially" means the directions that are parallel to the tire axis.

"Bead" means an annular tensile member that is associated with holding the tire to the rim. The beads are wrapped by ply cords and shaped, with or without other reinforcement elements such as flippers, chippers, apexes or fillers, toe guards and chafers.

"Belt Structure" or "Belts" means at least two annular layers or plies of parallel cords, woven or unwoven, underlying the tread, unanchored to the bead, and having both left and right cord angles in the range from 17° to 27° with respect to the equatorial plane of the tire.

"Breakers" or "tire breakers" means the same as belt or belt structure or reinforcement belts.

"Carcass" means the tire structure apart from the belt structure, tread and underlay over the plies, but including the beads.

"Carcass cord" means ply cord.

"Circumferential" means directions extending along the perimeter of the surface of the annular tread perpendicular to the axial direction.

"Cord" means one of the reinforcement strands of which the plies in the tire are comprised.

"Equatorial Plane" or "EP" means the plane perpendicular to the tire's axis of rotation and passing through the center of its tread.

"Footprint" means the contact patch or area of contact of the tire tread with a flat surface at zero speed and under normal load and pressure.

"Lateral" means in the direction parallel with the tire axis.

"Loaded" used as an adjective for any parameter refers to that parameter for a tire that is loaded—i.e. inflated, mounted on a vehicle, and resting on a surface.

"Meridional" refers to a tire profile cut along a plane that includes the tire's rotational axis.

"Normal Inflation Pressure" means the specific design inflation pressure and load assigned by the appropriate standards organization for the service condition for the tire.

"Normal Load" means the specific design inflation pressure and load assigned by the appropriate standards organization for the service condition for the tire.

"Ply" means a layer of rubber-coated parallel cords.

"Radial" means in a direction orthogonal to the tire axis.

"Radial Ply Tire" means a belted or circumferentially-restricted pneumatic tire in which at least one ply has cords which extend from bead to bead and are laid at cord angles between 65° and 90° with respect to the equatorial plane of the tire.

"Section Height" means the radial distance from the nominal rim diameter to the outer diameter of the tire at its equatorial plane.

"Section Width" means the maximum linear distance parallel to the axis of the tire and between the exterior of its sidewalls when and after it has been inflated at normal pressure for 24 hours, but unloaded, excluding elevations of the sidewalls due to labeling, decoration or protective bands.

"Shoulder" means the upper portion of sidewall just below the tread edge.

"Sidewall" is the portion of a tire between the tread and the bead.

"Tangential" and "tangentially" refer to segments of circular curves that intersect at a point through which can be drawn a single line that is mutually tangential to both circular segments.

"Tire crown" means the tread, tread shoulders and adjacent portions of the sidewalls.

"Tread contour" means the shape of a tire tread as viewed in axial cross section.

"Tread Width" means the arc length of the tread surface in the plane that includes the axis of rotation of the tire.

"Unloaded" used as an adjective for any parameter refers to that parameter for a tire that is unloaded—i.e. inflated and not resting on a surface.

DETAILED DESCRIPTION OF THE PREFERRED EMBODIMENT

Prior Art Construction

Figure 1:
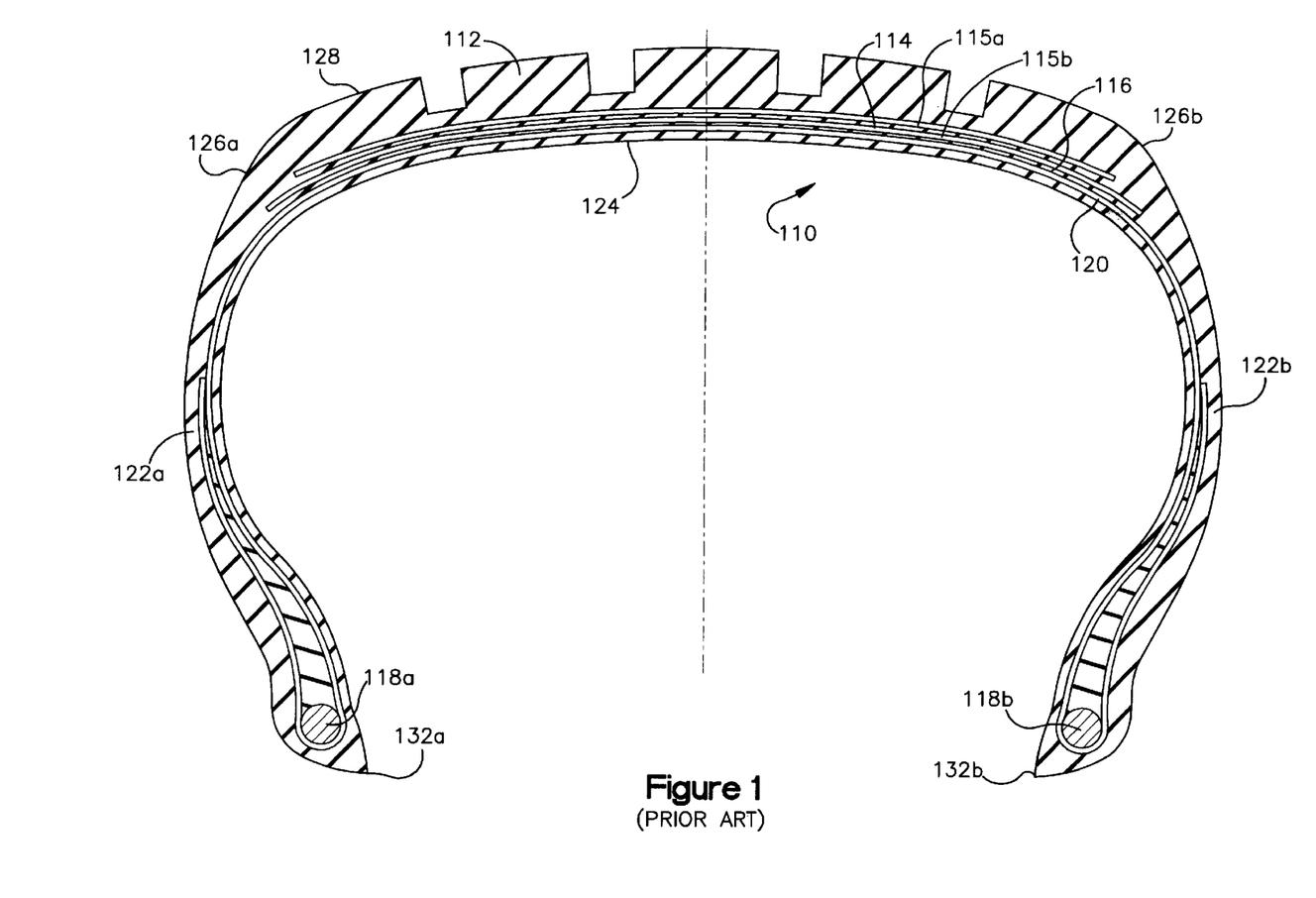
FIG. 1 shows a cross-section of a prior art pneumatic radial ply tire, showing its profile as it would be when inflated but not resting on a road surface (unloaded)

FIG. 1 shows a meridional cross-section of a prior art pneumatic radial tire 110 for a vehicle, showing its profile as it would be when inflated to normal inflation pressure and not resting on a road surface ("unloaded"). The tire 110 has a tread 112, a belt structure ("belts") 114 comprising one or more belts 115a, 115b, and a carcass 116. The carcass 116 has two inextensible annular beads 118a,118b, a radial ply 120 extending between and wrapped around the beads, and two sidewalls 122a,122b. The ply 120 passes near the tire's inner circumferential surface 124 and is reinforced with high modulus synthetic carcass cords (not shown). The section where each sidewall 122a,122b meets the edge of the tread 112 is a shoulder 126a,126b, respectively. The radially outermost surface 128 of the tread 112 forms a crown 130. The radially innermost points of the tire 110 are toes 132a,132b.

Preferred Embodiment

Figure 2:
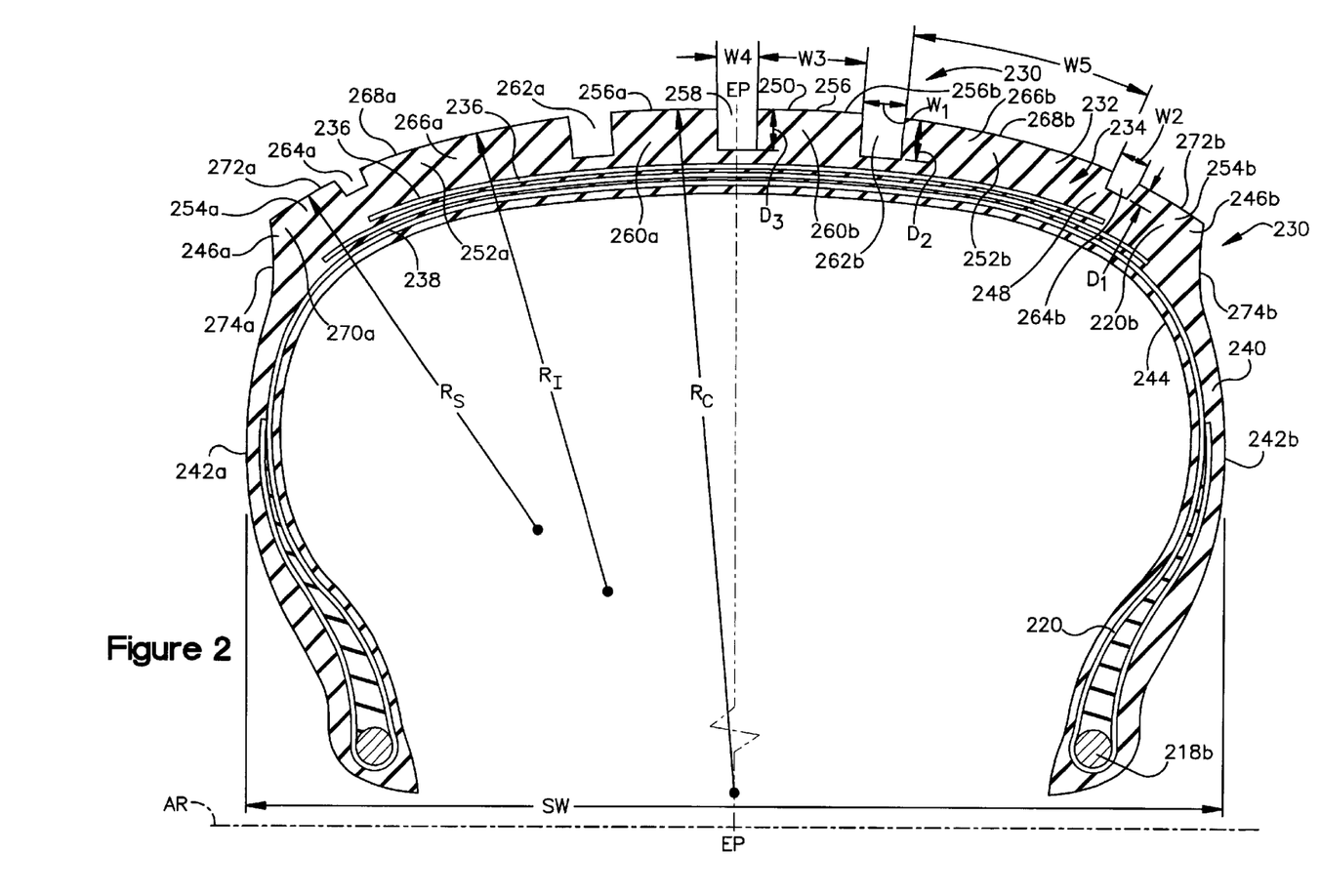
FIG. 2 shows a cross-section of a portion of a pneumatic radial ply tire of the present invention as it would be when inflated and mounted on a wheel rim.

FIG. 2 is a meridional cross-section of the tire 230, in accordance with the present invention, showing its profile as it would be when inflated and unloaded, and showing various dimensional specifications. In general terms, the tire 230 is designed in such a way that the footprint width W (the distance between the tire shoulders that is in contact with the roadway) increases progressively with the applied load. That is, as the load becomes lower, the footprint width becomes progressively narrower and as the load gets higher, the footprint width gets progressively wider. The tires characteristic of having its footprint increase progressively is an important aspect of the invention in that even the load generated by light braking will benefit from an increased footprint width. Under very heavy braking, i.e. high load, the entire tread width between the shoulders forms the footprint which is quite wider than the footprint under normal load. The width vs load curve is to be s-shaped (FIG. 4) so as to avoid excessive sensitivity to small load variations, as normally encountered in driving conditions. Furthermore, in order to maximize the performance potential of the tire, the extended tread width can be approximately equal to the section width (SW) of the tire. For practical reasons, the tread width is preferably no wider than the section width (SW) of the tire because the tire could rub against the wheel well of the vehicle on which it is mounted.

Referring to FIG. 2, the tire 230 has a tread 232, a belt structure ("belts") 234 comprising two or more belts 236, 238 and a carcass 240. The carcass 240 has two inextensible annular beads 218a,218b, a radial ply 220 extending between and wrapped around the beads and two sidewalls 242a,242b. The ply 220 passes near the tire's inner circumferential surface 244 and is reinforced with high modulus synthetic or other carcass cords (not shown). Where each sidewall 242a,242b joins the tread 232 is a shoulder region 246a,246b, respectively. The section of the tread 232 between the shoulder regions 246a,246b forms a crown 248.

The tread 232 is subdivided transversely into a central portion 250, which is disposed symmetrically about the equatorial plane EP, intermediate portions 252a, 252b, which intersect the central portion and extend outward toward shoulder portions 254a, 254b, respectively, of the tire 230. In the central portion 250, the outer central surface 256 which comprises surfaces 256a and 256b, has preferably one circumferential, peripheral, central groove 258 which is symmetrically disposed about the equatorial plane EP and forms central ribs 260a,260b, of width W3, between central groove 258 and intermediate, circumferential, peripheral, grooves 262a, 262b. The central groove 258 is not a prerequisite and may be deleted. Central groove has a depth of D3 and a width of W4. The intermediate portions 252a, 252b, extend between intermediate grooves 262a, 262b, respectively, and shoulder decoupling groove 264a, 264b, respectively, and form intermediate ribs 266a, 266b, respectively. The intermediate ribs 266a, 266b each have an intermediate outer surface 268a, 268b preferably of an equal width W5 which projects less radially to the outside of the tire than the central outer surface 256 of the central portion 250. The shoulder portions 254a, 254b extend between the shoulder decoupling groove 264a, 264b and the intersection of the tread 232 with the sidewalls 242a, 242b, respectively, and form shoulder ribs 270a, 270b, respectively. The decoupling groove 264a, 264b are preferably disposed above the ends of the upper breaker 236 of the belt package 234. However, it is within the terms of the present invention for the ends of the breaker 236 to extend outward of the decoupling grooves 264a, 264b towards the shoulder portions 254a,254b or inward of the decoupling grooves towards the intermediate portions 252a,252b by a distance of 1% to 5% of the footprint width under normal load (NLFPW). If the ends of the breaker 236 only extend in the intermediate portions 252a,252b a distance to the decoupling grooves 264a, 264b of more than 5% of the footprint width under normal load (NLFPW), the tire would have poor operating characteristics as far as treadwear, high speed and stability are concerned. Conversely, if the ends of the breaker 236 extend into the shoulder portions 254a,254b a distance from the decoupling grooves 264a, 264b of more than 5% of the footprint width under normal load (NLFPW), the tire would have poor operating characteristics because of a poor durability at the breaker ending location and higher weight. The shoulder ribs 270a, 270b each have a shoulder outer surface 272a, 272b, which projects less radially to the outside of the tire than the adjacent intermediate outer surface 268a, 268b of the intermediate ribs 266a, 266b or the central outer surface 256 of the central ribs 260a,260b. The shoulder outer surface 272a, 272b of the shoulder portions 254a, 254b, respectively, extend less radially outward from the axis of rotation AR than the intermediate outer surface 268a,268b of the intermediate portions 252a, 252b so that in the normally loaded, inflated state, the shoulder portions 254a, 254b do not contact the road surface.

Referring again to FIG. 2, the intermediate grooves 262a, 262b have a width W1 that is relatively wide, such as 30% to 50% of the central rib width W3 and a depth D2 that is approximately equal to the depth D3 of groove 258 and relatively deep, such as 6 mm to 9 mm. The intermediate grooves 262a, 262b constitute a flexible joint or decoupling means between the intermediate ribs 266a, 266b and the central ribs 260a, 260b, respectively.

An important aspect of the present invention relates to the shoulder decoupling grooves 264a,264b which allow the shoulder ribs to contact the road surface during heavy loading. The shoulder decoupling grooves 264a,264b, which separate the shoulder portions 254a, 254b from the intermediate portions 252a, 252b, respectively, can have a width W2 between 40% and 100% of the width W1 of the intermediate grooves 262a,262b. In essence, the shoulder decoupling groove should be as wide as needed to prevent groove closure for the expected maximal load. The shoulder decoupling grooves can have a depth D1, which is in the range of 30% to 100% and most preferably between 40% to 70% the depth D2 of the intermediate grooves 262a,262b. If the depth D1 is greater than 100% of the depth D2, then the tire would have poor operating characteristics because, as the decoupling effect becomes very important, the shoulder portions 254a, 254b would touch the road even at low or normal loads, thus disabling the sought after beneficial action of the shoulder rib. Also, durability of the breaker package could be affected. Conversely, if the depth D1 is less than 30% of the depth D2, then the tire would have poor operating characteristics because, as the decoupling effect would be prevented from occurring, the shoulder portions 254a,254b would be structurally prevented from touching the ground even at high braking load.

Figure 3A:
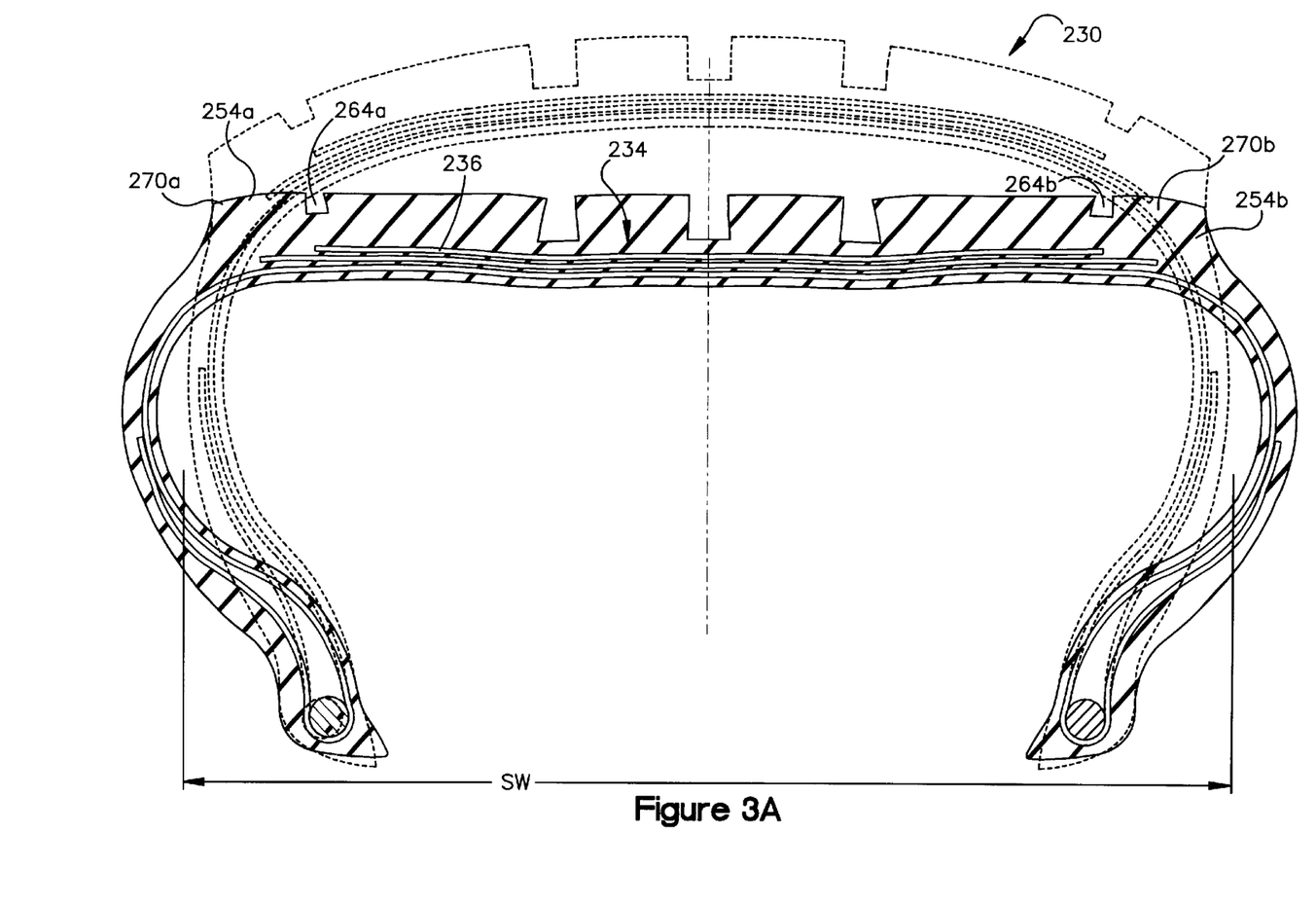
FIG. 3A shows a comparison of the cross-section of the tire of FIG. 2 before loading (as dotted line) and the tire of FIG. 2 when it is deflected on a roadway (as solid line) at normal load.
Figure 3B:
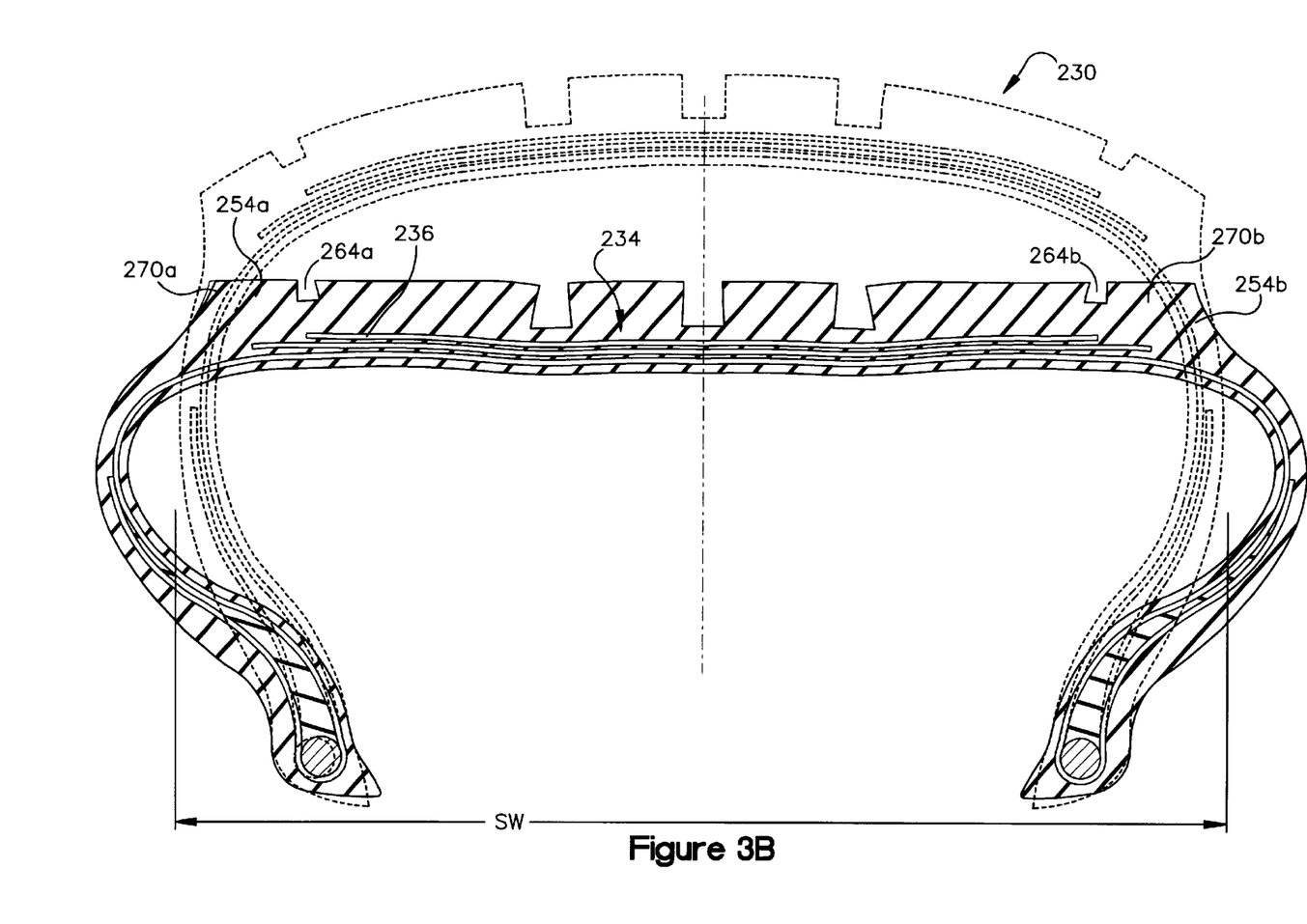
FIG. 3B shows a comparison of the cross-section of the tire of FIG. 2 before loading (as dotted line) and the tire of FIG. 2 when it is deflected on a roadway (as solid line) at high load (during a braking for example)

The shoulder portions 254a, 254b intersect the sidewalls 242a, 242b, respectively, to form an undercut section 274a, 274b to provide flexibility in the shoulder sections so that the outer shoulder surface 272a, 272b of the shoulder ribs 270a,270b can move into contact with the road surface during high loading, as shown in FIG. 3B. Undercut section 274a, 274b are defined as curves tangent to the sidewalls 242a, 242b, and joining the edges of the shoulder portions 254a and 154b respectively. Moreover, the outer surface of the undercut sections 274a, 274b forms with the outer shoulder surface 272a, 272b an angle "a" between 180 degrees and 270 degrees. This feature allows tuning of the wanted maximum contact width, while being limited by mechanical strength considerations.

Referring again to FIG. 2, the outer surfaces 256a, 256b of the central ribs 260a,260b or outer surface 256 of central rib 260 are relatively flat and have an axial contour defined by an internal curve having radius RC. The current example is based on a single radius of curvature, which does not preclude using multiple radii. The intermediate ribs 266a, 266b, which are separated from the central ribs 260a, 260b by the intermediate decoupling grooves 262a, 262b, respectively, have an intermediate outer surface 268a, 268b forming a curved contour defined by a radius of curvature RI, which, like RC, is large but less than the radius RC. The shoulder ribs 270a, 270b are separated from the intermediate ribs 266a, 266b, respectively, and have an outer surface 272a, 272b with a radius of curvature RS that is less than both the radius of curvature RI of the intermediate ribs 266a, 266b and the radius RC of the central ribs 260a, 260b. As illustrated in FIG. 2, the central rib outer surface, the intermediate rib outer surfaces, and the shoulder rib outer surfaces form a single continuous curved contour line.

Figure 4:
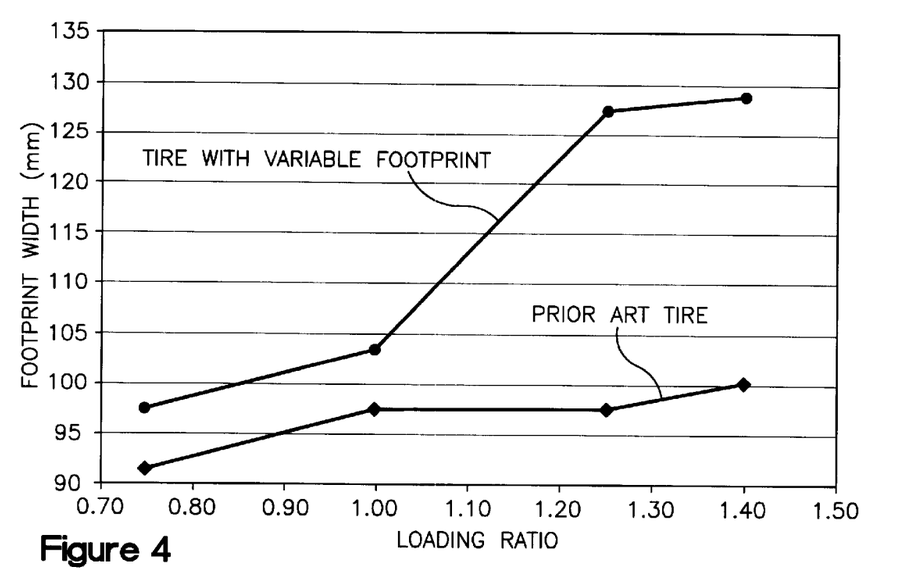
FIG. 4 is a graph showing the comparison of the footprint width under load of the standard prior art tire of FIG. 1 compared to the tire of the present invention as shown in FIG. 2.

Referring now to FIG. 3A, there is illustrated the tire 230 of FIG. 2 in dotted lines when the tire is inflated at a normal pressure and mounted but not under load and in solid lines when inflated at normal pressure and under a normal load. Referring now to FIG. 3B, there is illustrated the tire 230 of FIG. 2 in dotted lines when the tire is inflated at a normal pressure and mounted but not under load and in solid lines when inflated at normal pressure and under a heavy load to aid in discerning the differences in contour of the tire under normal load and heavy load conditions. The novel construction of tire 230 enables the footprint width to increase progressively with applied load. That is, the tire is symmetric so that the shoulder ribs 270a, 270b are not in contact with the road surface during normal loading, but contribute to the widening of the footprint and thus the dry braking performance under heavy load as shown in the solid cross section of FIG. 3B. A further advantage of the shoulder ribs 270a, 270b not being in contact with the road during normal operation is that the problems of steering due to uneven road contact patterns is greatly reduced. Another advantage of the variable adaptive footprint is that the progressive increase in the amount of tread on the road does not provide sudden on-off contact, but rather a progressive adaptation for optimal benefits. This can be visualized on the footprint width versus loading ratio curve, as shown in FIG. 4. When the load fluctuates in normal driving, the footprint width does not change very much. However, when the load substantially increases and exceeds the expected braking load threshold under normal conditions, the footprint width suddenly increases. Heavier braking will then further increase the footprint width up to the maximum width, which is approximately equal to the section width SW, as made possible by the shape of the shoulder rib. This desired behavior gives to that curve a unique s-shape. Note that it is not desirable for a constantly changing footprint width because of the uneven wear that might ensue. Also, since the shoulder decoupling grooves 264a, 264b are disposed essentially over the ends of the belt 236 and are shallow, the belt package 234 does not require extra widening toward the shoulder portions 254a, 254b of the tire, which reduces durability problems and tire weight. The extended width of the tread during maximum load, as shown in FIG. 3B, is at the maximum equal to the section width SW of the tire under nominal inflation pressure.

Referring to FIG. 4, there is illustrated an example of how the footprint width increases with increased load in the present tire as compared with the increased footprint in the prior art tire. We define the loading ratio as the ratio between the dynamic load seen by the tire in service conditions and the standard load the tire has to statically carry when fitted on the vehicle. As shown, the footprint width of the adaptive width tire shown in FIGS. 2 and 3 (A,B) maintains a similar width under a low loading ratio but increases evenly as the loading ratio exceeds 1, whereas the prior art tire maintains a substantially even footprint width as the loading ratio exceeds 1.

Figure 5A:
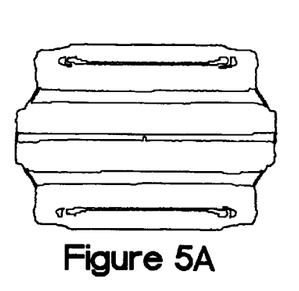
FIGS. 5A, 5B, 5C and 5D show the variation of the footprints of tires of the present invention when subjected to a normal load and a braking load compared to the footprints of prior art tires as shown in FIG. 1.
Figure 5B:
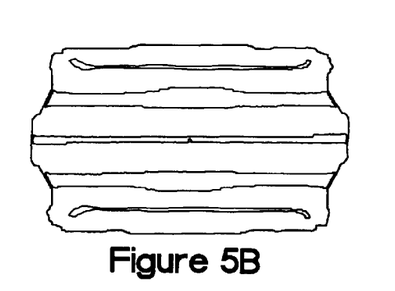
Figure 5C:
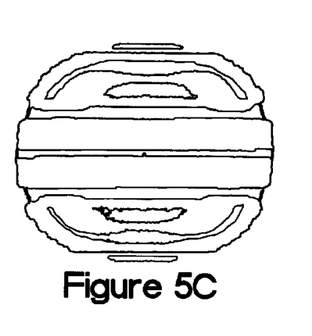
Figure 5D:
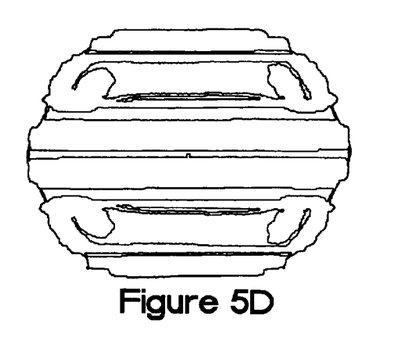

The variation in the footprint shape between a standard tire and a tire with an adaptive footprint is also shown in FIGS. 5A, 5B, 5C and 5D (FIGS. 5A–5D). FIG. 5A shows a prior art tire under normal load and FIG. 5B shows the same tire under heavier braking load. Note that under both normal and heavier loads, the width of the footprint remains substantially the same. However, under a heavier load, the length of the footprint does increase as is generally known in the prior art, which is of marginal benefit for braking performance. FIG. 5C shows an adaptive footprint shaped tire of the present invention under standard load and FIG. 5D shows the latter tire under heavy braking load. With the tire of the present invention, under heavy braking load not only does the footprint shape lengthen, but is also becomes substantially wider, i.e., up to the section width of the tire. This is a graphic illustration of the advantage of the present invention because the increased width of the footprint is very important in braking. At the same time, it is important to limit the amount of tread, i.e., the footprint on the road during normal operation to increase fuel economy.

Figure 6A:
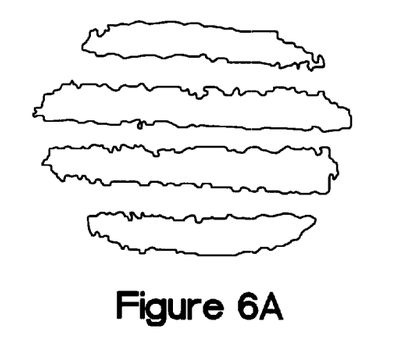
FIGS. 6A, 6B, and 6C show the comparison of the footprints of a prototype tire of the present invention under increasing load.
Figure 6B:
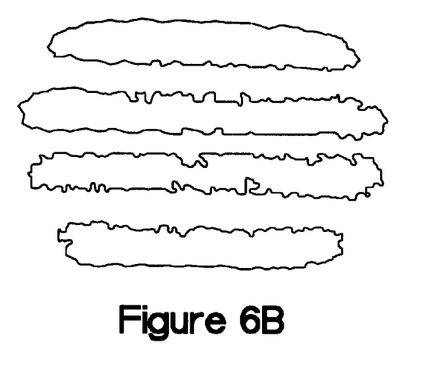
Figure 6C:
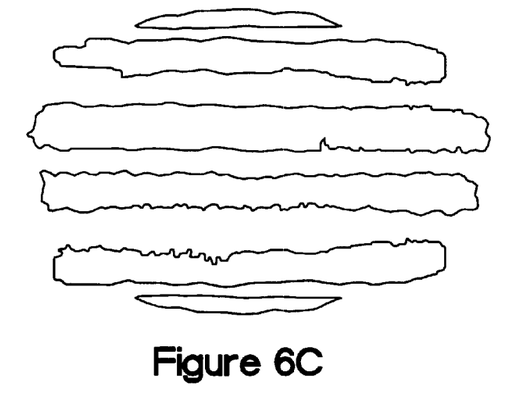

Referring to FIGS. 6A, 6B and 6C, there is illustrated the footprint of a prototype tire according to the present invention having a load dependent variable footprint width as described herein. A notable feature is that a constant footprint shape is maintained throughout the applied load spectrum. The different loading conditions are set forth in Chart 1 hereinbelow for a 135/70R16 tire. Note as the load increases from simply being inflated and mounted on a rim in FIG. 6A through normal loading conditions in FIG. 6B and finally heavy braking conditions in FIG. 6C, the footprint becomes progressively longer and wider.

| CHART 1 | | | |
|---|---|---|---|
| | FIG. 6A | FIG. 6B | FIG. 6C |
| VEHICLE LOAD CONDITION: | EMPTY | NORMAL | BRAKING |
| FP-WIDTH: | 89 mm | 94 mm | 120 mm |
| FP-LENGTH | 122 mm | 143 mm | 177 mm |

Regarding the performance of this prototype, and how it compares with a prior art tire of the same dimension, the following chart (Chart 2) proves that the two main claims of this new design are reached (the results are normalized around the prior art construction):

| CHART 2 | | |
|---|---|---|
| | Prior Art | Preferred embodiment |
| Rolling Resistance Performance: | 100 | 107 |
| Dry braking performance: | 100 | 104 |

While the tread 232 is shown to be symmetrical relative to the equatorial plane EP of the tire 230, the tread may be non-symmetrical, in which case both the intermediate portions 252a,252b and the shoulder portions 254a,254b can be non-symmetrical and have different and unequal widths, depending on the design. These portions will anyway still be separated by shoulder decoupling grooves.

While the invention has been described in combination with embodiments thereof, it is evident that many alternatives, modifications, and variations will be apparent to those skilled in the art in light of the foregoing teachings. Accordingly, the invention is intended to embrace all such alternatives, modifications and variations as fall within the spirit and scope of the appended claims.

What is claimed:

1. A radial ply tire having a crown region, two sidewalls extending radially inward from a first end of the sidewalls at axially outer shoulder portions of the crown region to beads disposed at a second end of the sidewalls, a carcass having one or more plies extending through the crown region and between the beads and wrapped thereabout, a belt structure overlying the crown region of the carcass, and a tread overlying the belt structure and secured to the sidewalls in the shoulder portions, the tire characterized by:

the tread being subdivided transversely into a central portion having at least one central rib, shoulder portions having shoulder ribs, and intermediate portions having intermediate ribs between the central portion and the shoulder portions;

the tread having first and second intermediate grooves between the central portion and the intermediate portions;

the tread having first and second shoulder decoupling grooves between the intermediate portions and the shoulder portions;

a radially outer surface of the tread being subdivided transversely into at least one central rib outer surface, intermediate rib outer surfaces, and shoulder rib outer surfaces wherein the at least one central rib outer surface has a first radius, the intermediate rib outer surfaces have a second radius less than the first radius, and the shoulder rib outer surfaces have a third radius less than the second radius such that when the tire is inflated and mounted on a wheel rim the central rib outer surface, the intermediate rib outer surfaces, and the shoulder rib outer surfaces form a single continuous curved contour lines; and the first and second shoulder decoupling grooves having a depth being 30% to 100% of the depth of the first and second intermediate grooves, whereby a footprint width of the tread can expand from a first footprint width under normal load to a second footprint width under heavy load wherein the second footprint width is 10% to 40% greater than the first footprint width.

2. The tire of claim 1 wherein the first and second shoulder decoupling grooves have a width being 40% to 100% of the width of the first and second intermediate grooves.

3. The tire of claim 2 wherein the first and second shoulder decoupling grooves have a depth being 40% to 70% of the depth of the first and second intermediate grooves.

4. The tire of claim 1 further including undercut sections where the shoulder portions intersect the sidewalls to provide flexibility in the shoulder portions to enhance the ability of the shoulder ribs to move into contact with a road surface during heavy loading.

5. The tire of claim 4 wherein the undercut sections have curved surfaces between axially outer edges of the shoulder portions and the sidewalls so that the curved surfaces are tangent to the sidewalls and form an angle between 180 degrees and 270 degrees with the axially outer edges of the shoulder portions.

6. The tire of claim 1 wherein the central portion is disposed symmetrically about an equatorial plane of the tire.

7. The tire of claim 1 wherein the central portion has a central groove which is symmetrically disposed about an equatorial plane of the tire and forms two central ribs.

8. The tire of claim 1 wherein:

the third radius is less than the second radius such that when the tire is in a normally loaded condition the intermediate rib outer surfaces are in contact with the road surface but the shoulder rib outer surfaces are not in contact with the road surface, and when the tire is in a heavy loaded condition the intermediate rib outer surfaces and the shoulder rib outer surfaces are in contact with the road surface.

9. The tire of claim 1 wherein the tread is non-symmetrical about the equatorial plane EP of the tire.

10. The tire of claim 1 wherein each of the shoulder portions has no more than two shoulder ribs.

11. The tire of claim 1 wherein:

the belt structure comprises one or more belts; and at least a radially outermost belt of the one or more belts has first and second axially outer belt ends that are axially disposed relative to a point below the first and second shoulder decoupling grooves, respectively, such that the first and second axially outer belt ends are disposed within 5% of the first footprint width on either axial side of the point below the first and second shoulder decoupling grooves, respectively.

12. The tire of claim 11 wherein the first and second axially outer belt ends of at least the radially outermost belt of the one or more belts are axially disposed below the first and second shoulder decoupling grooves, respectively.

* * * * *